United States Patent
Giaimo

[19]

[11] Patent Number: 5,907,975
[45] Date of Patent: Jun. 1, 1999

[54] BALL-JOINT SHIFTER WITH OFFSET TRUNNIONS

[75] Inventor: Joseph Giaimo, Kenilworth, N.J.

[73] Assignee: Pro.5, Kenilworth, N.J.

[21] Appl. No.: 08/898,587

[22] Filed: Jul. 22, 1997

Related U.S. Application Data

[60] Provisional application No. 60/022,064, Jul. 23, 1996.

[51] Int. Cl.⁶ .................................................. B60K 20/04
[52] U.S. Cl. ................................. 74/473.34; 74/471 XY; 403/115
[58] Field of Search ........................ 74/473.34, 471 XY; 403/114, 115, 122

[56] References Cited

U.S. PATENT DOCUMENTS

| | | | |
|---|---|---|---|
| 1,330,912 | 2/1920 | Short | 74/473.3 |
| 1,446,068 | 2/1923 | Rhoads | 74/606 R |
| 3,251,237 | 5/1966 | Warmkessel | 74/473.34 |
| 3,988,558 | 10/1976 | Josemans et al. | 200/335 |
| 4,324,501 | 4/1982 | Herbenar | 403/115 |
| 4,333,360 | 6/1982 | Simmons | 74/473.34 |
| 4,569,245 | 2/1986 | Feldt et al. | 74/73.34 |
| 4,569,545 | 2/1986 | Feldt et al. | 74/473.34 |
| 4,669,329 | 6/1987 | Suzuki | 74/473.34 |
| 4,787,257 | 11/1988 | Ott et al. | 74/473.34 |
| 4,916,966 | 4/1990 | Weishaupt et al. | 74/473.34 |
| 5,313,853 | 5/1994 | Olmsted et al. | 74/473.34 |

*Primary Examiner*—Charles A. Marmor
*Assistant Examiner*—William C. Joyce
*Attorney, Agent, or Firm*—Browdy and Neimark

[57] ABSTRACT

A shifter for a manual transmission has a lever arm extending upward from the transmission housing. The lever arm has a ball pivotable in a socket for gear selection, so that the gear shift handle can revolve about the pivot. The lever arm includes trunnions sliding in slots to prevent the lever arm from twisting. The invention offsets the axis of the trunnions from the geometric center of the ball; this offset prevents binding and allows smooth shifting. The invention may include springs for pressing the ball into the socket, adjustable stop members for limiting the throw of the lever arm, and a mounting plate and cover for holding the ball-and-socket joint together.

17 Claims, 4 Drawing Sheets

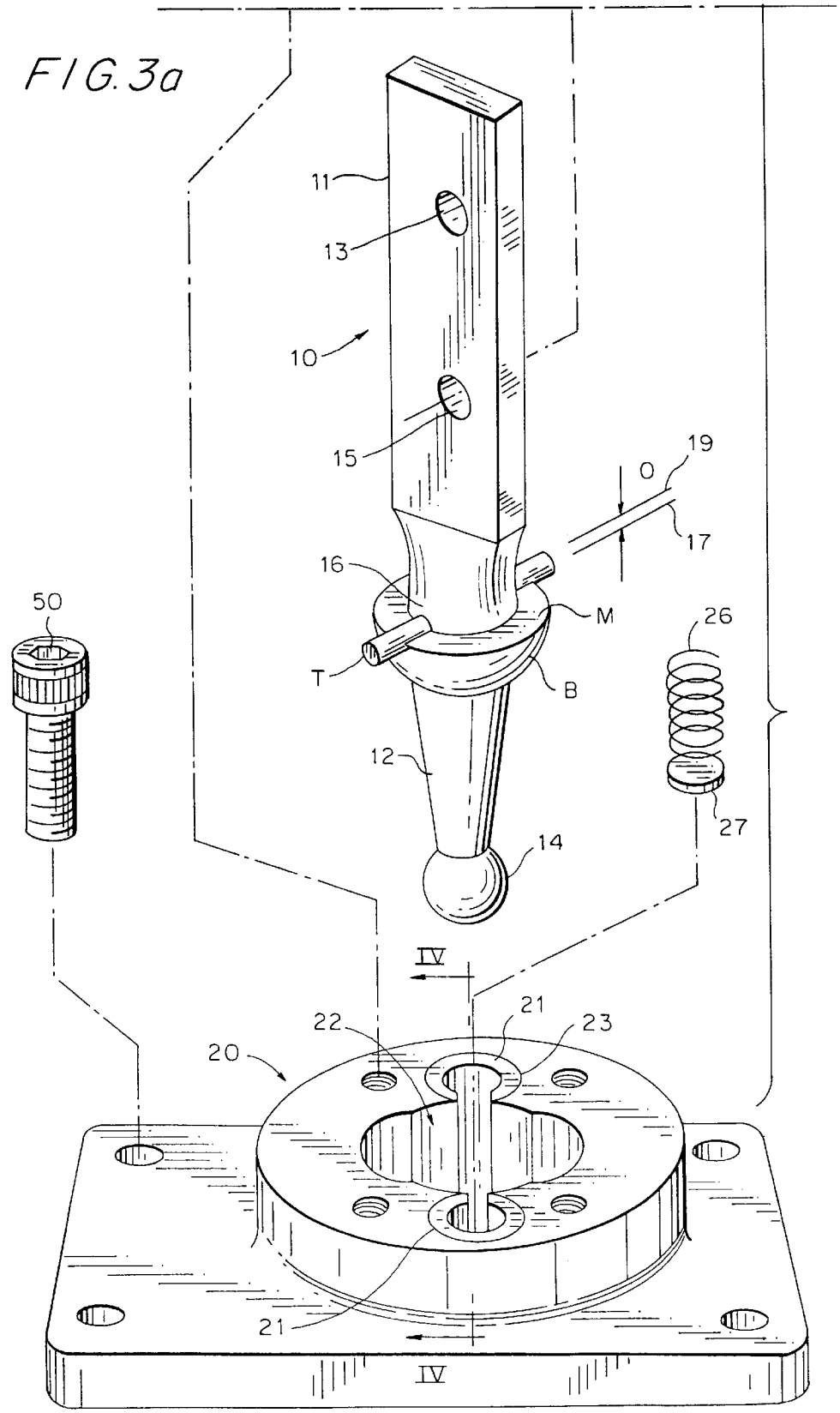

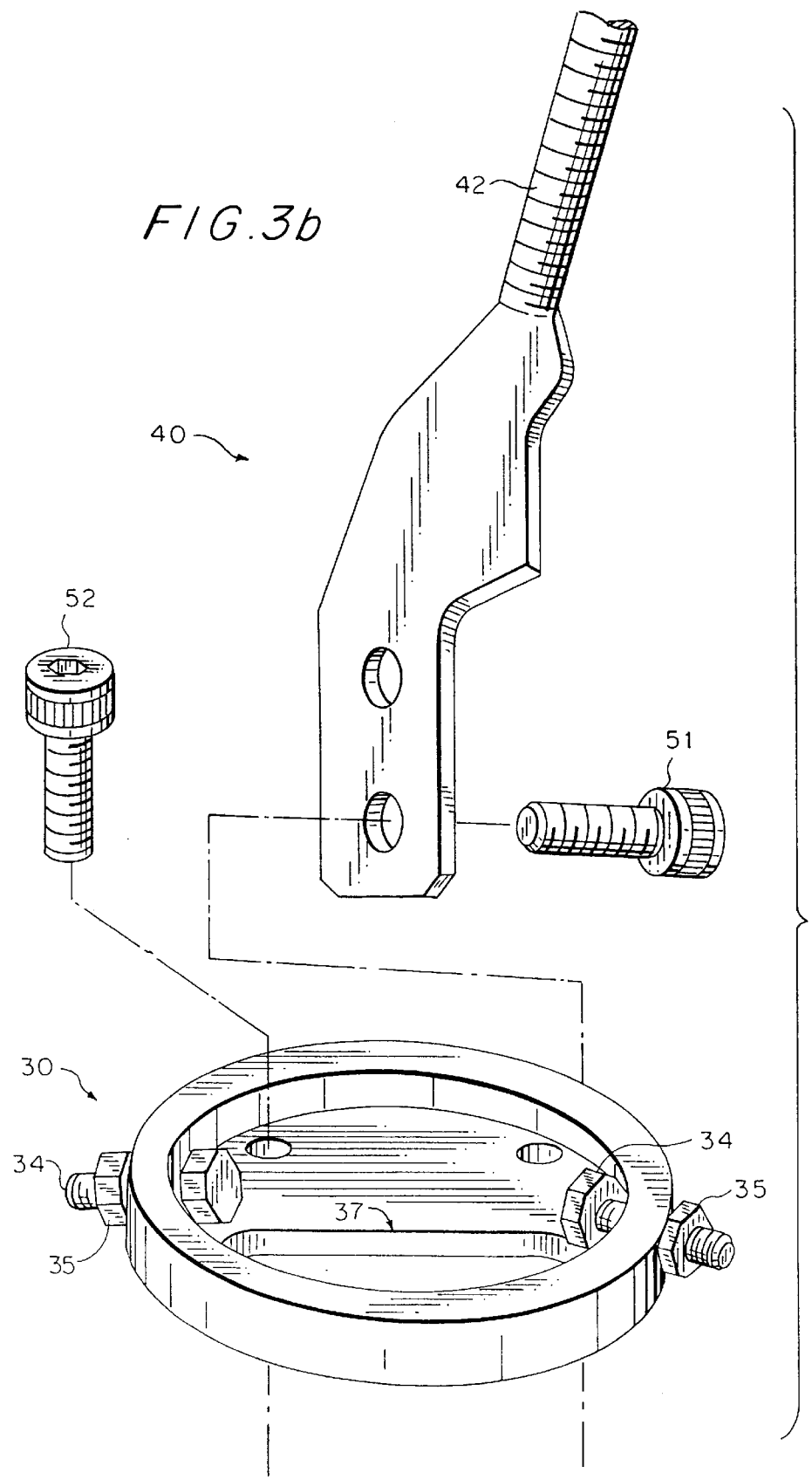

BALL-JOINT SHIFTER WITH OFFSET TRUNNIONS

CROSS-REFERENCE TO RELATED APPLICATION

This application claims the benefit of U.S. Provisional Application No. 60/022,064 filed on Jul. 23, 1996.

FIELD OF THE INVENTION

The present invention relates to automotive gear shift mechanisms.

BACKGROUND OF THE INVENTION

Quick gear shifting is very important in automotive sports and racing because the engine cannot drive the wheels during the shift, while the clutch pedal is depressed and the engine and wheels are disengaged. The vehicle is slowing down during the entire time interval of the shift. Thus, motor racing and sports enthusiasts or professionals carefully select their manual-transmission shifters and will pay large amounts of money for a shifter which can reduce their shifting times by even a small fraction of a second.

A shifter consists basically of a lever arm pivoted near its middle for rotation about the pivot, so that the upper part of the lever arm describes part of the surface of a sphere. The upper end includes a handle, grasped by the driver to shift gears. The lower end is inside the transmission housing and includes an end, usually shaped as a ball, that engages the internal mechanisms which move the power-transmission gears about inside the housing.

The handle and the lower ball are not problem areas for fast shifting. The central pivot is the place where conventional shifters fail to deliver optimum speed.

The conventional speed shifter's central pivot is a ball joint, with a spherical or semi-spherical portion resting in a mating hollow hemi-spherical cup or socket. Thus, the lever arm can rotate about two mutually perpendicular horizontal axes. To prevent the lever arm from rotating about a vertical axis (i.e., about its own length) the conventional shifter includes short cross arms, or pins, rigidly attached to the lever arm. These outwardly-extending cross arm pins, or trunnions, slide up and down within vertical housing slots immediately adjacent to the hemi-spherical ball socket. The trunnions are co-linear (axially aligned) and in fact are conveniently made as just the outer portions of a single straight dowel pressed-fitted into a hole in the ball portion of the lever arm. The two slots on either side of the ball socket, like the two trunnions, are aligned and their sides ordinarily define two parallel planes. The slots allow the lever arm to rock side to side without rotating. The trunnions have a circular cross-section so that the lever arm can also rock to and from (in the front-rear direction) and the trunnions can rotate about their axis within the slots without binding.

A pivot such as that described above can be made low in friction by careful fabrication, lubrication, and/or material selection; but it is found in practice that the conventional ball-joint/trunnion-joint shifter tends to bind, hang up, and slow the shift, even when carefully made. It is not as smooth as it should be for really fast shifting.

Binding and hanging-up, of course, indicate mechanical interference. Since extra force is required to overcome binding, wear on the shifter is also increased.

The conventional shift lever includes a feature which has been universally adopted by prior workers in the field: namely, the various parts of the shifter pivot are geometrically aligned. In particular, the trunnions' axis passes directly through the center of the ball joint, i.e., that sphere whose surface is described by the ball of the lever arm or by the socket of the housing, when the lever arm is nested in the housing.

The present inventor has found that this prior-art alignment of the trunnion axis with the ball joint center is the cause of the binding which has plagued shifters. The alignment problem has escaped the notice of those of ordinary skill, because it is subtle and unexpected.

One reason that the prior-art shifter pivots of this type bind is best understood from FIG. 1, labeled "prior art". Two offset circles indicate the shifter lever arm ball B and the housing socket S. Two slot walls $W_1$ and $W_2$ confine the trunnion T. (Although cross-hatching indicates cross sectional views, FIG. 1 is schematic and is an idealized cross section.) Clearances are exaggerated for clarity. The geometrical center of the ball B is indicated by a conventional center mark C with light and dark areas within a circle about the center point. The center mark C is centered within the cross-sectional area of the trunnion T because of the geometrical alignment of the trunnion T and the center of the ball B.

FIG. 1 indicates a position of the lever arm in a gear shift at which the handle of the lever arm (not shown in FIG. 1) is an angle $\theta$ from the generally vertical or neutral gear position. The arm is being pulled to the right, tending to rotate the ball B in the direction of the arrow labeled A.

No mechanism can be perfectly made, and dirt and damage can interference with normal clearances. The conventional shifter, with the trunnion axis passing directly through the center of the ball, ignores this fact. Considering FIG. 1, motion in the direction of shifting (in the direction A) might cause the ball B to contact the socket S on the left side of the picture while the trunnion T contacts wall $W_2$. Given the sure fact that the mechanism is not perfect, this could happen in many different ways depending on accident, design, and manufacture.

A line L is shown joining the two contact points. Since the trunnion T and ball B are a solid unit, and so are the socket S and wall $W_2$, if there is any interference then continued arm motion in the direction A will exert a wedging action that tends to jam the lever arm. The jamming occurs because the shifting force A is trying to rotate the line L between two constraining walls.

The more nearly horizontal the line L in FIG. 1, the greater is the leverage of the wedging action and the greater the resistance to fast shifting. A shallow angle is not unlikely, given the close tolerances needed in the clearances of the trunnion T and ball B.

There may also be other or additional causes of binding and hanging-up in the prior-art geometrically-aligned shifters, which have not yet been analyzed here or elsewhere.

Several previous workers in the shifter field have made inventions with ball-and-socket type shifters. However, these workers have not recognized the binding problem.

Feldt et al, U.S. Pat. No. 4,569,245, also discloses a ball-and-socket type shifter but does not mention binding or shift resistance. Feldt is concerned with springs.

Warmkessel, U.S. Pat. No. 3,251,237, presents involved dimensional calculations and geometries whose object is better leverage and reduced friction.

U.S. Pat. No. 1,446,068 to Rhoads aims to reduce lubricant leakage.

U.S. Pat. No. 1,330,912 patent to Short discloses a shifter with two inverted ball-and-socket pivot bearings. One of the two bearings comprises a hemispherical cap 26 resting on a ball surface 23, and the other consists of head member 29 in contact with an inner dome surface 24 of the pedestal 21. Short also includes pins 33 whose heads slide in curved slots 34 in the cap 26.

The object of Short's invention is to provide a cheap unit using stamped parts. There is no disclosure regarding binding.

Thus, while the binding problem has been recognized, previous inventors have not even attempted to solve it.

SUMMARY OF THE INVENTION

Accordingly, the present invention has an object, among others, to overcome deficiencies in the prior art such as noted above.

A particular object of the invention is to provide a shifter that reduces or eliminates binding and hanging-up while shifting gears.

The invention concerns shifter pivots of the type described above, but unlike the prior-art shifters, the invention provides for offsetting the center line of the trunnions below (or above) the center of the sphere described by the ball portion of the lever. This offset prevents binding and leads to smoother and faster shifting.

Referring to FIG. 2, the shifter pivot of the invention includes the same basic elements disclosed in prior-art FIG. 1, but the axis of the trunnions T is offset directly below (or alternatively, above—shown in FIG. 6) the geometrical center C of the ball B, as indicated by the center mark. The offset, indicated by extension lines and dimension arrows, is labeled O. Also advantageous is the fact that the spherical portion of the ball has a planar upper surface which is offset from the geometrical center of the ball.

Because of the offset O, when the shift arm is rotated to the angle θ the center C of the ball B is moved slightly to the right. The reason for this is that the trunnion T is closely held between the walls $W_1$ and $W_2$ and cannot move very much either left or right; therefore when the arm is rotated to the right everything which is above the center of the trunnions T, including the center of the ball B, also moves to the right (with the amount of rightward motion depending on the distance from the trunnions T).

The binding of FIG. 1, with the ball B jammed against the left-hand side of the socket S, is now nearly impossible because the ball has been moved to the right at the same time as it has rotated in the direction of the arrow A.

Even if interference occurs due to dirt, damage, or machining error, with the offset O of the invention there will be no binding because the direction of rotation A tends of unjam the mechanism, unlike the prior art. The contact line L in the invention of FIG. 2 is slanted oppositely to the contact line L of prior-art FIG. 1. Because of this opposite inclination, rotation in the direction A will effectively shorten, rather than lengthen, the horizontal projection of the contact line L. The rotation force of the arrow A will thus tend to lift the ball B off of the socket S at the contact point.

Thus, the present-invention shifter with altered pivot geometry cannot jam, and the long-existing but misunderstood problem of the prior-art shifter pivots is overcome.

BRIEF DESCRIPTION OF THE DRAWING

The above and other objects and the nature and advantages of the present invention will become more apparent from the following detailed description of preferred embodiments taken in conjunction with drawings, wherein:

FIG. 3a is an exploded perspective view of a preferred embodiment of the invention.

FIG. 3b is a continuation of the view of FIG. 3a.

FIG. 6 is a perspective view of the lever arm showing an offset reversed from that of FIG. 3a.

DETAILED DESCRIPTION OF PREFERRED EMBODIMENTS

Figure 1:
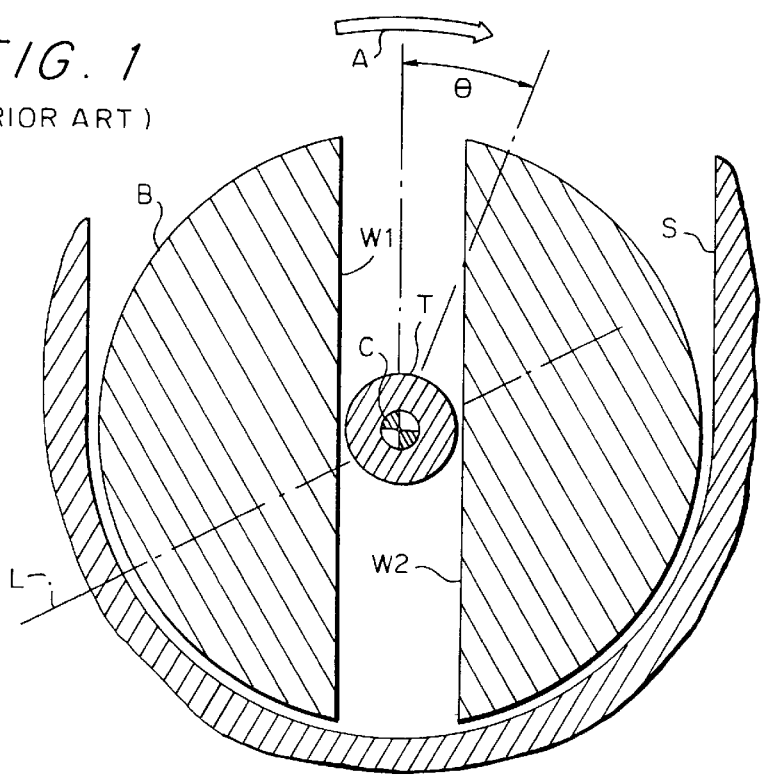
FIG. 1, labeled "prior art", is a schematic cross sectional view of a conventional shifter.

FIGS. 3a and 3b show a preferred embodiment of the present invention. A lever arm 10 (FIG. 3a), preferably of steel, includes an upper portion 11 with threaded holes 15 for attachment of a handle 40 (FIG. 3b) by means of bolts 51. The handle 40 includes a threaded portion 42 for attachment of the shift knob (the part which the driver grasps; not shown in FIGS. 3a and 3b).

A lower portion of the lever arm 10 includes a convergent shaft 12 and an engaging end or actuator 14 for engaging the gear mechanism inside the transmission housing (not shown), which is conventional. The intermediate portion of the arm 10 includes a ball B and trunnion T. The ball is preferably of a low-friction plastic such as nylon (e.g., DELRIN). The trunnion is preferably a single hard steel dowel or rod inserted by press fitting into a hole through the arm 10. The ball B slides onto the lower length of a cylindrical portion 16 of the intermediate part of the arm 10. The cylindrical portion 16 preferably has a diameter of 0.75 inches (19 mm). The ball B may optionally be of metal and/or integral with the lever arm 10. The ball B preferably has hemi-cylindrical grooves on the upper surface M in which rest the lower halves of the trunnion extensions T; this keeps the ball B from rotating about the vertical axis of the cylindrical portion 16. The ball B may also extend upwardly in a spherical or cylindrical extension which fully encompasses trunnion extension T. When the ball B is firmly seated against the trunnions T, the preferred distance from the geometrical center of the engaging end 14 and the axis of the trunnions T is 1.98 inches (50.3 mm).

The lever arm 10 fits into a cavity 22 in a mounting plate 20 when the shifter is assembled, such that the engaging end 14 of the lever arm 10 protrudes past the bottom of the mounting plate 20 into the transmission (not shown), so that the engaging end 14 can engage the transmission internally. The plate 20 is fastened onto the transmission housing with bolts 50. The mounting plate 20 is preferably machined from solid aluminum.

Figure 4:
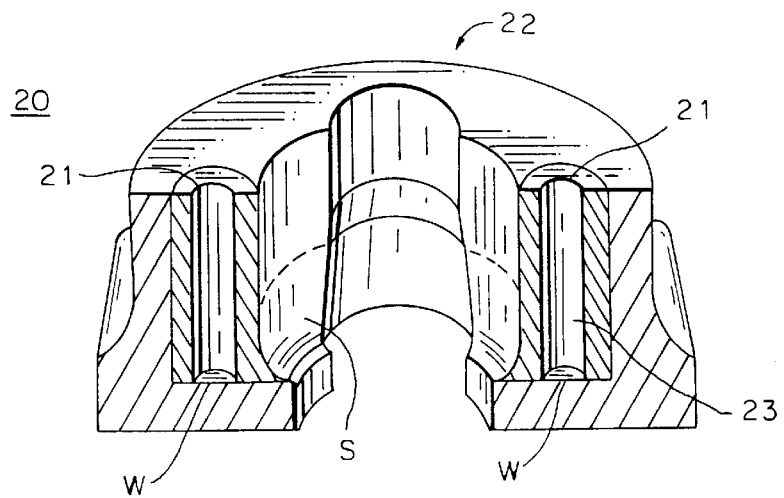
FIG. 4 is a partially perspective and partially cross-sectional view along lines IV—IV of FIG.

The socket S (also in FIG. 2) is not visible in FIG. 3, but is disposed at the bottom of the cavity 22 as shown in FIG. 4. The surfaces of both the ball B and the socket S are made smooth to prevent friction and reduce wear.

U.S. Pat. No. 4,569,245 issued to Feldt et al (which is incorporated herein by reference) shows the basic arrangement of a ball-and-socket shifter with trunnions in FIG. 17.

A cover 30 (FIG. 3b) includes an elongated opening 37 through which the upper end 11 of the lever arm 10 protrudes when the shifter is assembled. When the cover 30 is bolted to the mounting plate 20 with bolts 52, the lever arm 10 cannot be withdrawn. The cover 30 holds the ball B within the socket S of the mounting plate 20 as discussed below.

Figure 2:
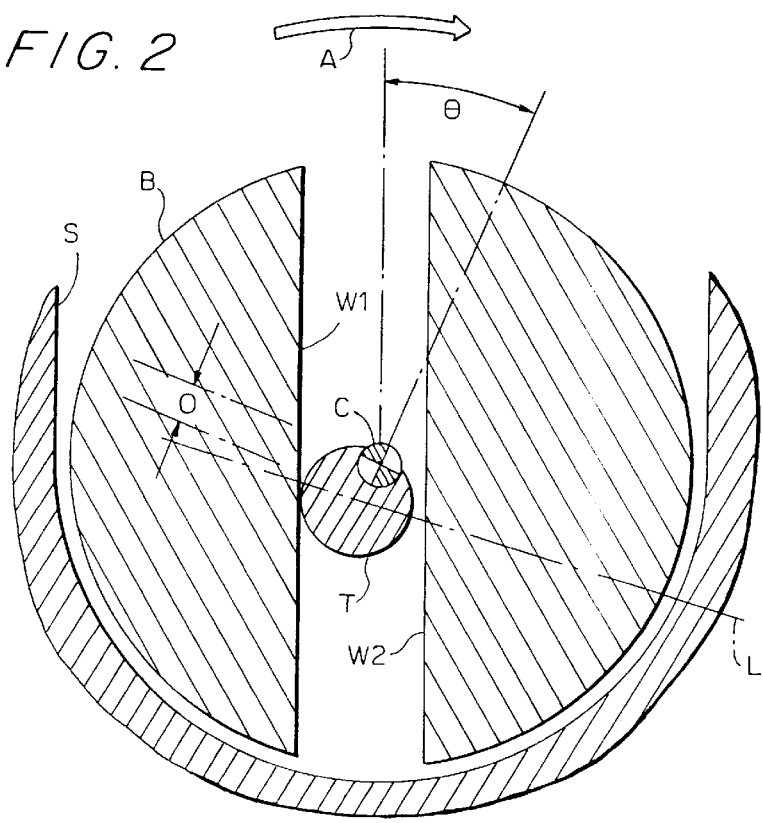
FIG. 2 is a schematic cross sectional view of the invention.

As best seen in FIG. 4, on either side of the mounting plate 20 are hardened steel tube sections 21, each with a longitudinal slot in which a respective end of the trunnion T rides when the shifter is assembled. The tube sections 21 are press-fitted into bores 23 in the mounting plate 20 and may also be held by screws passing through the sides of the mounting plate 20 into the tube sections. The slot sides, or lips, form the slot walls $W_1$ and $W_2$ which are shown in FIG. 2.

Preferably, a spring 26 is placed within each hardened tube 21. The two springs 26 are compressed between the underside of the cover 30 and the trunnions T when the cover 30 is bolted to the upper side of the mounting plate 20 by bolts 52. Steel discs 27 may also be placed into the tube sections 21 under the springs 26 to act as shims or to provide a stable base for each spring 26.

Because the springs 26 are compressed and continuously bear against the trunnions T, they also press the ball B down into the socket S. This prevents backlash and keeps the shifts smooth, since the force of the springs 26 is sufficient to keep the ball B against the socket S in normal use.

The invention also contemplates alternative mechanisms for pressing the ball B into the socket S, for example the leaf springs in FIG. 4 of the Feldt et al patent or the mechanism shown as prior art in FIGS. 10 and 11 of the Feldt et al patent.

The construction according to a preferred embodiment of the present invention also includes two stop bolts 34, each with a lock nut 35. The stop bolts 34 are screwed into threaded holes through the sides of the cover 30. They are adjusted and then locked with the lock nuts 35 after the shifter is installed on the transmission housing by the bolts 50. The stop bolts 34 limit the throw of the lever arm 10 to prevent damage to the transmission. When the shifter is installed, the lock bolts 34 are disposed at the rearward and forward ends of the cover 30.

The preferred embodiment shown in FIGS. 3a and 3b incorporates the offset O that is shown in FIG. 2. That is, the center line 17 of the trunnions T is below a parallel line 19 through the geometric center point of the ball B, as seen in FIG. 3a. In other words, the trunnion axis is closer to the transmission housing than is the center of the ball B.

Figure 6:
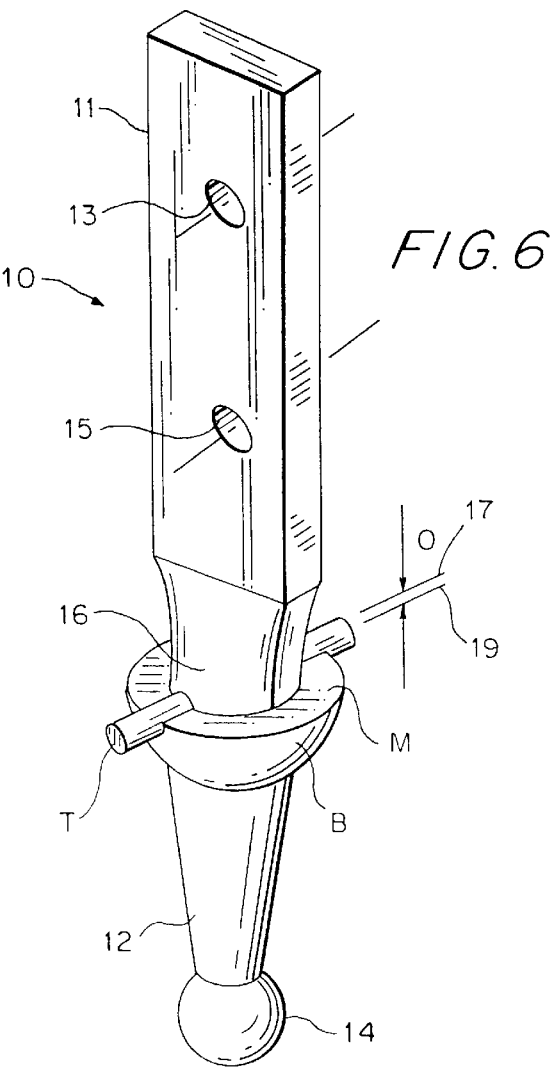

In addition, the invention also contemplates the trunnion axis 17 being above the parallel line 19 through the center of the ball, that is, farther from the housing than is the center of the ball. This is illustrated in FIG. 6.

FIG. 4 shows the inner structure of the base 20, including the spherical surface section acting as the socket S. The tube sections 21 are shown cut by the cross-section plane on their outer sides, and on the inner sides their walls W, on which the trunnions T bear, (i.e., $W_1$ or $W_2$ of FIG. 2) are visible. The trunnions are not shown in FIG. 4.

In a preferred embodiment of the present invention, the surface of the ball B describes a portion of a sphere with a nominal diameter of 1.210 inches (30.7 mm), i.e., radius of 0.605 inches (15.4 mm). This diameter is substantially less than the conventional ball diameter, and this smaller ball diameter is made possible by the altered pivot geometry of the invention, which reduces friction and binding. Thus, reduced ball diameter is a feature of the invention. A reduction in the ball radius lowers the pivot center by exactly that amount. Furthermore, the smaller socket reduces the size of the entire shifter base as compared to the transmission housing opening where the base is mounted, and makes it possible to lower the pivot even more.

The reduced ball diameter of the invention is also related to the preferred distance from the geometrical center of the engaging end 14 and the axis of the trunnions T, which as noted above is 1.98 inches (50.3 mm). Because of the offset O, the distance from the center of the engaging end 14 to the geometrical center of the ball B is very close to 2.00 inches (50.8 mm).

Due to the smaller-than-conventional ball B and socket S, this 2-inch distance is smaller than in prior-art shifters. The smaller distance has the advantage that the gear shift throw can also be reduced, with no loss of leverage, or else kept the same, with an increase in leverage for lowered shifting force. The "throw" is the horizontal motion made by the driver when shifting gears, by grasping the knob (not shown) screwed onto the end of the threaded portion 42 of the handle 40, and moving it to change gears.

A further advantage of the smaller-than-conventional ball B is that the diameter of the cylindrical portion 16 onto which the ball B slides can be reduced to the preferred diameter of 0.75 inches (19 mm).

The ball B and trunnion T conform to the offset geometry shown in FIG. 2 (which is, however, only schematic) The nominal offset O in the illustrated example of the present invention (FIGS. 3a, 3b, and 4) is preferably 0.024 inches (0.61 mm) plus or minus 0.001 inches (0.025 mm).

The invention contemplates various ranges of the ratio of the offset to the ball diameter: between 0% and 2%, between 0% and 5%, and between 0% and 10%. Here (and in the following claims) "between" zero and a number means that any deliberate non-zero offset up to the non-zero number is contemplated; of course, the ratio range does not include the end point zero itself, since the range would then include no offset. The present invention also contemplates the ranges of 1% to 3% and 1% to 6%. While any deliberate amount of offset is within the scope of the present invention, the present invention includes a preferred relationship between the amount of offset O and the diameter of the ball B. In the preferred embodiment the offset O is preferably about 1.5 to 2.5%, most preferably 2%, of the ball/socket diameter. If the ball B diameter is increased, the offset O is preferably increased by the same factor.

The clearance between the trunnions T and the walls $W_1$ and $W_2$ is also a factor that can affect the amount of offset. In the preferred commercial embodiment of the invention, the clearance (that is, the distance between the walls $W_1$ and $W_2$, less the trunnion diameter) is less than 0.010 inches (about 0.2 mm). Because the trunnion acts as a sort of pivot in the dynamics of binding, the invention contemplates a numerical relationship among the trunnion-to-wall clearance and the offset O, and/or the ball diameter. The exemplary preferred trunnion diameter is 0.315 inches (8.00 mm).

Figure 5:
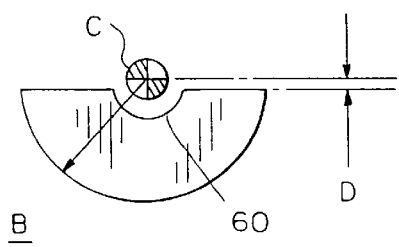
FIG. 5 is a perspective view of the ball along the trunnion axis.

The advantages of the present invention can be realized by proper milling (or other shaping) of the upper surface M of the ball B. Referring to FIG. 3a, the milled (or otherwise shaped) upper surface of the ball B, which is the flat surface visible in the drawing figure, defines a plane. It will be understood that such plane is preferably slightly below the geometrical center of the ball B. The difference is also shown in FIG. 5 as height difference D between the surface M and the center C of the ball B. The trunnions T preferably sit in grooves in the ball B which are exactly hemi-cylindrical, and are shown as a small semi-circle 60 in FIG. 5. The trunnion groove is preferably a half-cylinder so as to provide full support for but not to grip the trunnions. The trunnion axis (not shown in FIG. 5 but lying in the center of semi-circle 60) preferably lies in the plane of the upper ball surface. However, because of the offset O between the axis of the trunnion T and center of the ball B, the upper surface M is displaced slightly below the center of the ball B by the height difference D, which is preferably the same as the offset O, e.g., both 0.024 inches.

Referring to FIG. 4, it will be understood that the socket S, which is milled with a ball-end cutter, can have no overhang; it meets the cylindrical wall of the cavity in which it sits (at the dashed line in FIG. 4) exactly; and it will be understood that the ball B, if cut off or milled below its geometrical center, will have an upper edge not quite reaching to the cylinder-hemisphere boundary. Therefore, the planar surface of the ball B has a diameter which is effectively reduced in relation to the cylindrical portion, and the contact line L cannot extend as high up as otherwise; this reduces the possible inclination of the line L toward the horizontal and decreases the degree of possible jamming, and thereby attains the same object as the offset O does. The present invention includes the offset O, the ball B with a milled surface below (or above) the geometrical center, and also a combination of these two independent features.

It is to be understood that the crux of the present invention lies in the altered pivot geometry described herein, i.e., the axial center line of the trunnion being vertically offset from the center of the sphere which represents the spherical portion of the ball, and/or the other offset of the ball surface from the ball center. The remaining details of the shifter may be changed by those of ordinary skill in the art without affecting the basic and novel characteristics of the present invention, as long as the altered pivot geometry is retained.

Thus, for example, it is not necessary for the geometry of the trunnion to be cylindrical, the ends may be conical, hemi-cylindrical or of some other geometry as long as the center axis of that trunnion is vertically offset from the center of the shifter ball.

Furthermore, the lever arm 10 may be made integrally as one piece rather than as the two pieces shown in which handle portion 40 is bolted to upper section 11.

The present invention also includes variations of the respective clearances between, first, the trunnions and slots and, second, the socket and ball, so as to adjust the ratio of these clearances.

In general, the foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. In a shifter mountable on a housing of a manual transmission, the shifter comprising:

a base fixable to the transmission housing, said base including an at least partially spherical socket and slot walls; and a lever arm having a ball and a trunnion, said trunnion extending from opposite sides of said ball and being slidable within said slot walls of said base;

wherein said ball has a geometrical center and a spherical portion defining a ball radius about the geometrical center, the spherical portion of said ball being complementary to the spherical portion of said socket such that the spherical portion of said ball is rotatable and pivotally supported within the spherical portion of said socket and wherein the spherical portion of said ball includes a generally planar upper surface; and;

wherein said trunnion has an axial center line and the geometrical center of said ball, said axial center line of said trunnion, and said upper surface of said spherical portion are in a fixed geometric vertical relationship when said lever arm is upright;

the improvement comprising:
   a pivot geometry;
   wherein said pivot geometry comprises a vertical offset of the geometrical center of said ball from the axial center line of said trunnion.

2. The shifter according to claim 1, wherein said pivot geometry further comprises a vertical offset of said geometrical center of the ball from the upper surface of said spherical portion.

3. The shifter according to claim 1, further including resilient means for holding said ball in said socket.

4. The shifter according to claim 3, wherein said resilient means comprises a coil spring bearing against said trunnion.

5. The shifter according to claim 1, wherein said ball is made of low-friction plastic material.

6. The shifter according to claim 5, wherein said ball is removable from said lever arm.

7. The shifter according to claim 1, further including stop means for limiting a throw of said lever arm.

8. The shifter according to claim 1, further including mounting means for fixing said socket relative to said transmission housing.

9. The shifter according to claim 8, further including a cover removably attached to said mounting means, for holding said lever arm to said mounting means.

10. The shifter according to claim 1, wherein the axial center line of said trunnion is offset so as to lie below the geometric center of said spherical portion of the ball.

11. The shifter according to claim 10, wherein the axial center line of said trunnion lies within the plane of the upper surface of the spherical portion of said ball.

12. The shifter according to claim 1, wherein the axial center line of said trunnion is offset so as to lie above the geometric center of the spherical portion of said ball.

13. In a shifter mountable on a housing of a manual transmission, the shifter comprising:

a base fixable to the transmission housing, said base including an at least partially-spherical socket and slot walls; and a lever arm having a ball and a trunnion, said trunnion extending from opposite sides of said ball and being slidable within said slot walls of said base;

wherein said ball has a geometrical center and a spherical portion defining a ball radius about the geometrical center, the spherical portion of said ball being complementary to the spherical portion of said socket such that the spherical portion of said ball is rotatable and pivotally supported within the spherical portion of said socket and wherein the spherical portion of said ball includes a generally planar upper surface; and;

wherein said trunnion has an axial center line and the geometrical center of said ball, said axial center line of said trunnion, and said upper surface of said spherical portion are in a fixed geometric vertical relationship when said lever arm is upright;

the improvement comprising:
a pivot geometry;
wherein said pivot geometry comprises a vertical offset of the geometrical center of said ball from the axial centerline of said trunnion; and
wherein an amount of vertical offset is greater than 0% and less than about 10% of a diameter of said spherical portion of said ball.

14. The shifter according to claim 13, wherein said amount of vertical offset is greater than 0% and less than about 5% of a diameter of said spherical portion of said ball.

15. The shifter according to claim 14, wherein an amount of vertical offset is between about 1% and about 5% of a diameter of said spherical portion of said ball.

16. The shifter according to claim 15, wherein said amount of vertical offset is between about 1% and about 3% of a diameter of said spherical portion of said ball.

17. In a shifter mountable on a housing of a manual transmission, the shifter comprising:
a base fixable to the transmission housing, said base including an at least partially spherical socket and slot walls; and
a lever arm having a ball and a trunnion, said trunnion extending from opposite sides of said ball and being slidable within said slot walls of said base;
wherein said ball has a geometrical center and a spherical portion defining a ball radius about the geometrical center, the spherical portion of said ball being complementary to the spherical portion of said socket and the improvement wherein;
the axial center line of said trunnion is vertically offset from the geometrical center of said ball.

\* \* \* \* \*